(12) United States Patent
Horspool et al.

(10) Patent No.: US 11,726,704 B2
(45) Date of Patent: Aug. 15, 2023

(54) BUFFER OPTIMIZATION FOR SOLID-STATE DRIVES

(71) Applicant: Kioxia Corporation, Tokyo (JP)

(72) Inventors: Nigel Horspool, Great Missenden (GB); Julien Margetts, Thame (GB)

(73) Assignee: Kioxia Corporation, Tokyo (JP)

( * ) Notice: Subject to any disclaimer, the term of this patent is extended or adjusted under 35 U.S.C. 154(b) by 150 days.

(21) Appl. No.: 16/836,112

(22) Filed: Mar. 31, 2020

(65) Prior Publication Data

US 2021/0303199 A1 Sep. 30, 2021

(51) Int. Cl.
*G06F 3/06* (2006.01)
*G06F 15/78* (2006.01)

(52) U.S. Cl.
CPC .......... *G06F 3/0656* (2013.01); *G06F 3/0614* (2013.01); *G06F 3/0659* (2013.01); *G06F 3/0679* (2013.01); *G06F 15/7807* (2013.01)

(58) Field of Classification Search
None
See application file for complete search history.

(56) References Cited

U.S. PATENT DOCUMENTS

| | | | |
|---|---|---|---|
| 9,720,860 B2 | 8/2017 | Rose et al. | |
| 2008/0059706 A1* | 3/2008 | Aigo | G06F 12/0866 711/118 |
| 2009/0089481 A1* | 4/2009 | Kapoor | G06F 3/0604 711/103 |
| 2009/0157946 A1* | 6/2009 | Arya | G06F 13/4239 711/103 |
| 2010/0161936 A1 | 6/2010 | Royer et al. | |
| 2014/0250272 A1 | 9/2014 | Hall et al. | |
| 2015/0356033 A1* | 12/2015 | Rose | G06F 13/4221 710/310 |

(Continued)

OTHER PUBLICATIONS

Amber Huffman et al., "Serial ATA Native Command Queueing, An Exciting New Performance Feature for Serial ATA," A Joint Whitepaper by Intel Corporation and Seagate Technology, Jul. 2003, 12 pages.

(Continued)

*Primary Examiner* — Charles Rones
*Assistant Examiner* — Jonah C Krieger
(74) *Attorney, Agent, or Firm* — Allen & Overy LLP (57) ABSTRACT

A solid-state drive having an integrated circuit comprising a controller that is configured to determine, for data transferred between a host interface of the integrated circuit and nonvolatile semiconductor storage device interface of the integrated circuit, the availability of an internal buffer of the integrated circuit to transparently accumulate the transferred data, and (i) if the internal buffer is available, accumulate the data from target nonvolatile semiconductor storage devices or the host in the internal buffer, or (ii) if the internal buffer is not available, accumulate the data unit from the target nonvolatile semiconductor storage devices or the host in an external buffer communicatively coupled to the controller, wherein the external buffer is external to the integrated circuit. The controller then provides the accumulated data to the respective interfaces to furnish a read or write request from the host.

24 Claims, 3 Drawing Sheets

(56) References Cited

U.S. PATENT DOCUMENTS

| | | | | |
|---|---|---|---|---|
| 2019/0146714 A1* | 5/2019 | Krishnan | ............. | G06F 3/0608 |
| | | | | 711/154 |
| 2020/0183592 A1* | 6/2020 | Lim | ................... | G11C 11/5642 |
| 2020/0287846 A1* | 9/2020 | Elias | .................. | H04L 49/3027 |

OTHER PUBLICATIONS

Walker, Don H., "A Comparison of NVMe and AHCI," Enterprise Storage OCTO, Jul. 31, 2012, 40 pages.

* cited by examiner

BUFFER OPTIMIZATION FOR SOLID-STATE DRIVES

FIELD

The present disclosure relates to solid-state drives and methods that enable a reduction in DRAM bandwidth usage, a reduction in power consumption, and a reduction in latency when processing read and write requests from a host.

BACKGROUND

A solid-state drive (SSD) generally has faster performance, is more compact, and is less sensitive to vibration or physical shock than a conventional magnetic disk drive. Given these advantages, SSDs are being used in more and more computing devices and other consumer products in lieu of or in addition to magnetic disk drives, even though the cost-per-gigabyte storage capacity of SSDs is significantly higher than that of magnetic disk drives.

SSDs utilize physical memory cells that comprise nonvolatile semiconductor storage devices, such as NAND devices, to store data. A system-on-chip (SoC) controller is used in an SSD to manage the transfer of data between a host and the memory cells of the SSD. Writing data to and reading data from the physical memory cells of SSDs typically involves shuffling data between various memory cells. SSDs often employ buffers to handle the transfer of data by the SoC when processing a read request or a write request from a host. Specifically ring buffers are often used as they are simple to implement and manage in both SoC controller and firmware functions. The ring buffers often occupy a large amount of memory so they are stored in dynamic random-access memory (DRAM) located external to the controller.

Ring buffers in external DRAM require significant memory bus bandwidth usage to cope with high data transfer rates. Additionally, transferring large amounts of data, as are often involved in read and write request from a host, to an external DRAM would increase the power consumption of the SSD. There is therefore a long felt need optimized data transfers between a host and an SSD which reduce power consumption and reduce latency.

SUMMARY

According to an embodiment of the present disclosure there is provided a solid-state drive (SSD) comprising a plurality of nonvolatile semiconductor storage devices. The SSD also comprises an integrated circuit comprising a host interface configured to communicatively couple the integrated circuit to a host, a controller, and a device interface configured to communicatively couple the integrated circuit to the plurality of nonvolatile semiconductor storage devices. Additionally, the SSD comprises an internal buffer forming a part of the integrated circuit, and an external buffer communicatively coupled to the controller, the external buffer being external to the integrated circuit. The host interface is configured to receive a read request for data from the host, wherein the data subject to the read request is segmented into a plurality of data units. The device interface is configured to determine one or more target nonvolatile semiconductor storage devices of the plurality of nonvolatile semiconductor storage devices in which the data subject to the read request are stored. The controller is configured to determine, for each data unit of the plurality of data units, the availability of the internal buffer to temporarily accumulate the data unit, wherein (i) if the internal buffer is available, accumulate the data unit from the one or more target nonvolatile semiconductor storage devices to the internal buffer, and (ii) if the internal buffer is not available, accumulate the data unit from the one or more target nonvolatile semiconductor storage devices to the external buffer. The host interface is further configured to transfer accumulated data corresponding to the data subject to the read request to the host.

In some implementations, the controller is further configured to remove from the internal buffer and the external buffer the data units that have been transferred to the host. In certain implementations, each of the internal buffer and the external buffer comprises a plurality of write buffers and a plurality of read buffers. In further implementations, each of the read and write buffers comprise ring buffers. In some implementations, there are more read buffers than write buffers. In certain implementations, the SSD further comprises a programmable firmware configuration circuit coupled to the memory controller that is configured to set a number of read buffers and a number of write buffers in the internal buffer.

In further implementations, the internal buffer resides in a local memory associated with the controller. In some implementations, the local memory comprises static random-access memory (SRAM). In certain implementations, the external buffer resides in a memory external to the integrated circuit. In further implementations, the external memory comprises dynamic random-access memory (DRAM). In some implementations, each nonvolatile semiconductor storage device comprises a NAND chip. In certain implementations, the controller comprises a system-on-chip (SoC) controller.

According to another embodiment of the present disclosure there is provided an SSD comprising a plurality of nonvolatile semiconductor storage devices. The SSD also comprises an integrated circuit comprising a host interface configured to communicatively couple the integrated circuit to a host, a controller, and a device interface configured to communicatively couple the integrated circuit to the plurality of nonvolatile semiconductor storage devices. Additionally, the SSD comprises an internal buffer forming part of the integrated circuit, and an external buffer communicatively coupled to the controller, the external buffer being external to the integrated circuit. The host interface is configured to receive a write request containing data from a host and target nonvolatile semiconductor storage devices of the plurality of nonvolatile semiconductor storage devices in which the data is to be written, wherein the data subject to the write request is segmented into a plurality of data units. The controller is configured to determine, for each data unit of the plurality of data units, the availability of the internal buffer to temporarily accumulate the data unit, wherein (i) if the internal buffer is available, accumulate the data unit from the host to the internal buffer, and (ii) if the internal buffer is not available, accumulate the data unit from the host to the external buffer. The device interface is configured to determine when the target nonvolatile semiconductor storage devices are ready to be written, and transfer accumulated data corresponding to the data subject to the write request to the target nonvolatile semiconductor storage devices when ready.

In certain implementations, the controller is configured to remove from the internal buffer the data units that have been transferred to the target nonvolatile semiconductor storage devices. In some implementations, the controller is configured to store a backup copy of the data units accumulated in the internal buffer, in the external buffer. The further implementations, the controller is configured to remove the backup copy of the data units in the external buffer once the accumulated data units are programmed into the target nonvolatile semiconductor storage devices. In certain implementations, the controller is configured to send a message to the host to indicate completion of the write request after all data units are temporarily accumulated in the internal buffer and the external buffer.

In some implementations, the device interface is configured to transfer the accumulated data units to the target nonvolatile semiconductor storage devices as and when the target storage devices become ready. In further implementations, the device interface is configured to program each nonvolatile semiconductor storage device in order to ready them for receiving the data units prior to transferring the accumulated data units. In certain implementations, the controller is configured to transfer the data units in the external buffer instead of the data accumulated in the internal buffer to the target nonvolatile semiconductor storage devices in the event of a power loss or a program failure in at least one of the nonvolatile semiconductor storage devices.

In some implementations, each of the internal buffer and the external buffer comprises a plurality of write buffers and a plurality of read buffers. In certain implementations, each of the read and write buffers comprise ring buffers. In further implementations, there are more read buffers than write buffers. In some implementations, the SSD further comprises a programmable firmware configuration circuit coupled to the memory controller that is configured to set a number of read buffers and a number of write buffers in the internal buffer.

In certain implementations, the internal buffer resides in a local memory associated with the controller. In further implementations, the local memory comprises static random-access memory (SRAM). In some implementations, the external buffer resides in a memory external to the integrated circuit. In certain implementations, the external memory comprises dynamic random-access memory (DRAM). In further implementations, each nonvolatile semiconductor storage device comprises a NAND chip. In some implementations, the controller comprises a system-on-chip (SoC) controller.

According to another embodiment of the present disclosure there is provided a method performed by a controller of an integrated circuit. The method comprises receiving a read request for data from a host interface connected to a host, wherein the data subject to the read request is segmented into a plurality of data units. The method also comprises receiving, from a device interface connected to a plurality of nonvolatile semiconductor storage devices contained in an SSD, one or more target nonvolatile semiconductor storage devices of the plurality of nonvolatile semiconductor storage devices in which the data subject to the read request are stored. The method further comprises determining, for each data unit of the plurality of data units, the availability of an internal buffer of the controller to temporarily accumulate the data unit, wherein the internal buffer and the controller form part of the integrated circuit, and wherein (i) if the internal buffer is available, accumulating the data unit from the one or more target nonvolatile semiconductor storage devices to the internal buffer, and (ii) if the internal buffer is not available, accumulating the data unit from the one or more target nonvolatile semiconductor storage devices to an external buffer communicatively coupled to the controller, wherein the external buffer is external to the integrated circuit. The method also comprises transferring the accumulated data corresponding to the data subject to the read request to the host interface for delivery to the host.

In some implementations, the method further comprises removing, by the controller, the accumulated data units from the internal buffer and the external buffer. In certain implementations, the method also comprises programming, by a firmware configuration circuit coupled to the controller, a number of read buffers and a number of write buffers in the internal buffer, wherein, preferably, the number of read buffers exceeds the number of write buffers.

According to another embodiment of the present disclosure there is provided a method performed by a controller of an integrated circuit. The method comprises receiving a write request from a host interface connected to a host, the write request containing data from the host and target nonvolatile semiconductor storage devices of a plurality of nonvolatile semiconductor storage devices contained in an SSD in which the data is to be written, wherein the data subject to the write request is segmented into a plurality of data units. The method further comprises determining, for each data unit, the availability of an internal buffer of the controller to temporarily accumulate the data unit, wherein the internal buffer and the controller form part of the integrated circuit, and wherein (i) if the internal buffer is available, accumulating the data unit from the host to the internal buffer, and (ii) if the internal buffer is not available, accumulating the data unit from the host to an external buffer communicatively coupled to the controller, wherein the external buffer is external to the integrated circuit. The method also comprises storing a backup copy of the data units accumulated in the internal buffer, in the external buffer.

In some implementations, the method further comprises removing, by the controller, the accumulated data units from the internal buffer and the external buffer. In certain implementations, the method also comprises removing, by the controller, the backup copy of the data units in the external buffer once the data units are programmed into the target nonvolatile semiconductor storage devices. In further implementations, the method comprises sending, by the controller, a message to the host to indicate completion of the write request after the data units are temporarily accumulated in the internal buffer and the external buffer.

In certain implementations, the method further comprises transferring, by the controller, the data units in the external buffer instead of the data accumulated in the internal buffer to the target nonvolatile semiconductor storage devices in the event of a power loss or a program failure in at least one of the nonvolatile semiconductor storage devices. In further implementations, the method further comprises programming, by a firmware configuration circuit coupled to the controller, a number of read buffers and a number of write buffers in the internal buffer, wherein, preferably, the number of read buffers exceeds the number of write buffers.

According to another embodiment of the present disclosure there is provided a non-transitory computer-readable medium storing instructions that, when executed by a processor, causes a controller of an integrated circuit of an SSD to perform a method. The method comprises receiving a read request for data from a host interface connected to a host, wherein the data subject to the read request is segmented into a plurality of data units. The method further comprises receiving from a device interface connected to a plurality of nonvolatile semiconductor storage devices one or more target nonvolatile semiconductor storage devices of the plurality of nonvolatile semiconductor storage devices in which the data subject to the read request are stored. The method also comprises determining, for each data unit of the plurality of data units, the availability of an internal buffer of the controller to temporarily accumulate the data unit, wherein the internal buffer and the controller form part of the integrated circuit, and wherein (i) if the internal buffer is available, accumulating the data unit from the one or more target nonvolatile semiconductor storage devices to the internal buffer, and (ii) if the internal buffer is not available, accumulating the data unit from the one or more target nonvolatile semiconductor storage devices to an external buffer communicatively coupled to the controller, wherein the external buffer is external to the integrated circuit. The method further comprises transferring the accumulated data corresponding to the data subject to the read request to the host interface for delivery to the host.

According to another embodiment of the present disclosure there is provided a non-transitory computer-readable medium storing instructions that, when executed by a processor, causes a controller of an integrated circuit of an SSD to perform a method. The method comprises receiving a write request from a host interface connected to a host, the write request containing data from the host and target nonvolatile semiconductor storage devices of a plurality of nonvolatile semiconductor storage devices contained in the SSD in which the data is to be written, wherein the data subject to the write request is segmented into a plurality of data units. The method also comprises determining, for each data unit, the availability of an internal buffer of the SoC controller to temporarily accumulate the data unit, wherein the internal buffer and the controller form part of the integrated circuit, and wherein (i) if the internal buffer is available, accumulating the data unit from the host to the internal buffer, and (ii) if the internal buffer is not available, accumulating the data unit from the host to an external buffer communicatively coupled to the controller, wherein the external buffer is external to the integrated circuit. The method further comprises storing a backup copy of the data units accumulated in the internal buffer, in the external buffer.

BRIEF DESCRIPTION OF DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION

To provide an overall understanding of the devices described herein, certain illustrative embodiments will be described. Although the embodiments and features described herein are specifically described for use in connection with a solid-state drive (SSD) having a controller, it will be understood that all the components and other features outlined below may be combined with one another in any suitable manner and may be adapted and applied to other types of SSD architectures requiring transparent buffer optimization.

Figure 1:
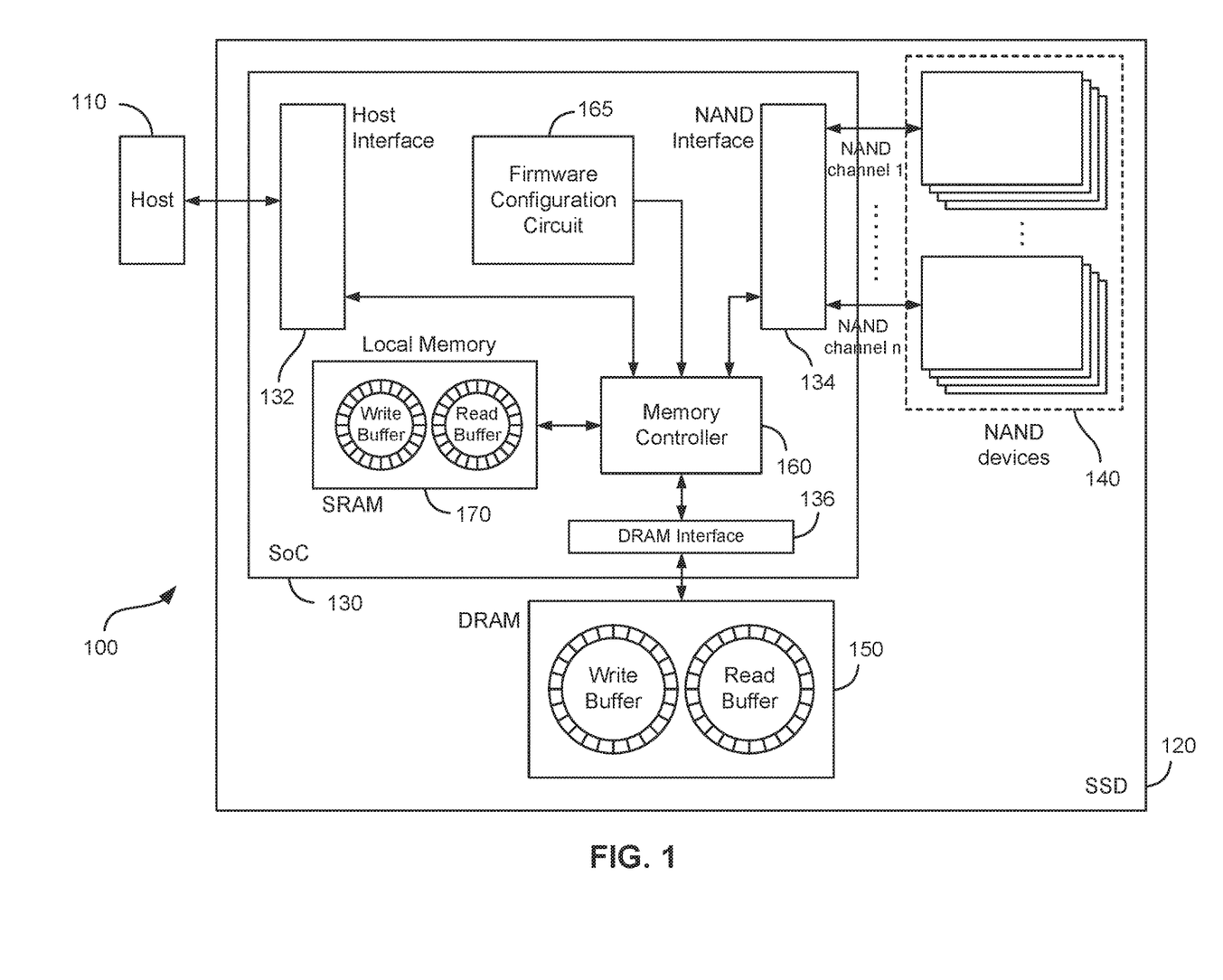
FIG. 1 shows a schematic representation of a solid-state drive (SSD), configured according to one or more embodiments of the present disclosure.

FIG. 1 is a block diagram of a computing system 100 comprising at least one host 110 in communication with a storage device 120. The host 110 is a computing system that comprises processors, memory, and other components as is generally known in the art, and which is not shown in FIG. 1 for the sake of brevity. Storage device 120 provides nonvolatile storage functionality for use by the host 110. Storage device 120 is a SSD, which is a nonvolatile storage device that may include an integrated circuit comprising a controller. Such an integrated circuit may also be referred to as a system-on-chip (SoC) 130. SoCs are advantageous in SSDs as they provide a single integrated circuit that contains all the required circuitry and components of the electronic system required for the SSD to function. The SoC therefore eliminates the need for modular architecture connected by a plurality of busses and buffers. SoC 130 is communicatively coupled to nonvolatile semiconductor-based storage elements 140 (such as NAND-based flash memory devices) as the storage medium. The storage medium may comprise a plurality of NAND chips, such as, for example, 32, 64, 128, 256 separate NAND chips, and each NAND chip can be running separate commands on individual dies (not shown) within the chip. As an example, the storage element 140 comprising N NAND chips each with d dies may be running up to (N×d) NAND commands at any one time.

SSD 120 also includes a memory external to the SoC 130, such as a dynamic random access memory ("DRAM") 150. SoC 130 comprises a host interface 132 which enables communication with the host 110 for the receipt of read and write requests, for example. SoC 130 also includes a NAND interface 134 for communication with the storage elements 140 (through a plurality of channels such as NAND channels 1 to n as shown in FIG. 1), and a DRAM interface 136 for communication with the memory 150 external to the SoC. Interface 132, on the SoC 130 may comprise a Serial Advanced Technology Attachment (SATA) connector or a NVMe™ connector (NVMe™ is an acronym for "NVM express," where "NVM" stands for "nonvolatile memory") operating with a PCIe™ ("Peripheral Component Interface Express") bus, for example. Interface 134 may comprise an Open NAND Flash Interface (ONFI) or a manufacturer's proprietary interface, for example. Interface 136 may comprise, for example, an interface according to, but not limited to: a Double Data Rate (DDR) memory bus standard such as DDR3, DDR4 or DDR5; a Low Power Double Data rate (LPDDR) memory bus standard such as LPDDR3, LPDDR4 or LPDDR5; a Hybrid Memory Cube (HMC) memory bus standard.

DRAM 150 comprises several buffers used to buffer data during read and write operations between the host 110 and the storage elements 140. Also shown in FIG. 1 is a memory controller 160 that enables the SoC 130 to perform various functions that facilitate the processing of read and write requests from the host 110. The SoC also includes a firmware configuration circuit 165 that is programmable. This allows the operation of the memory controller 160 to be adapted as needed. For example, the configuration circuit 165 may be programmed to allocate a certain minimum number of DRAM buffers as read buffers, and the remaining buffers as write buffers, so that the size of the read and write buffers may be adjusted according to, for example, the I/O workload from the host 110 being sent to the SSD 120. The SoC 130 also includes a local memory 170, such as a static random access memory (SRAM), that is part of the same integrated circuit as the SoC 130. As with the DRAM 150, the SRAM 170 also comprises several buffers that may be utilized by the memory controller 160 during operation. According to embodiments of the present disclosure, the buffers in the SRAM 170 may be used as read buffers and write buffers. The configuration circuit 165 may also be used to allocate a certain minimum number of the SRAM buffers as read buffers, and the remaining buffers as write buffers. Read and write accesses to the SRAM may complete more quickly than accesses to external DRAM and the power (energy) used to complete read and write transfers for SRAM may be lower than external DRAM. In addition, DRAM consumes power in order to keep the data stored refreshed in memory where SRAM only consumes a lower static power and is therefore more power efficient. Therefore, storing data and performing accesses to SRAM may offer advantages of higher speed and lower power than storing and accessing data in external DRAM. However, the size of SRAM is constrained due to space/area constraints on the SoC die and the higher cost of on-chip SRAM over the equivalent amount of external DRAM.

In order to facilitate transfer of data from the host 110 to the NAND devices 140 in response to a write command, or the transfer of data from the NAND devices 140 to the host 110 in response to a read command, the SSD performs some buffering in the local memory 170 that the SoC controller 160 maintains. Typically the data will be buffered in a write buffer and/or a read buffer before reaching its destination. For a large amount of data, these buffers will be located in a DRAM chip 150 external to the SoC 130, as shown in FIG. 1.

As an example, for each read request received from the host 110, a read command will be sent to the SoC 130 via the host interface 132 where it will be translated by controller 160 into NAND commands (i.e. commands for the NAND devices 140). These commands may require the controller 160 to access several NAND devices 140 simultaneously. The controller 160 will then read data from the NAND devices containing the requested data via the NAND interface 134, perform error correction where necessary, and transfer the corrected data to a read buffer. Typically, the read buffer is located in the external DRAM 150. Read commands to different NAND devices/dies may complete at different times, therefore data is accumulated in the read buffer as each command completes. When the data in the read buffer is ready, the data in the read buffer of the DRAM 150 will be transferred to the host 110. In some implementations, transfer of data from the read buffer may initiate before the whole data buffer is completely ready, when at least a minimum number of contiguous data units from the start of the data buffer are complete, with the expectation that the data buffer will be complete, or nearly complete, by the time the data transfer of the number of contiguous units has finished. The minimum number may, for example, consist of 50%, 60% or 75% of the total data units in the data buffer.

Similarly, for each write request received from the host 110, a write command will be sent to the SoC 130 via the host interface 132, which will then be translated by the controller into NAND commands. The write request may also contain target NAND devices 140 to which the data is to be written. Upon receipt of the write request, the controller 160 temporarily stores the all the data in a write buffer of the external DRAM 150, after which an acknowledgement message is sent to the host 110. The controller 160 then determines if the target NAND devices 140 are available to store the data. When the target NAND devices 140 are ready, the data in the write buffer of the external DRAM 150 will be written to the target NAND devices 140.

Additionally, the SoC 130 maintains a flash transition table that converts addresses that the host 110 uses to store data. The flash transition table translates the addresses specified by the host 110 in a read or write request into actual physical NAND addresses. These NAND addresses are the addresses of the target NAND devices 140. Further, the size of the DRAM 150 containing the read and write buffers is normally defined by the flash transition table. However, as the size of the memory provided by the NAND device 140 increases, the size of the flash transition table itself becomes large, and may be in the order of gigabytes of data. This may be too large to store within the SoC 130, and so in some cases the flash transition table and the read and write buffers are stored within the DRAM 150. However storing large flash transition tables in DRAM with wide read and write buffers increases the cost of the DRAM. The power consumption of such large buffers also increases which eats into the power budget of the SSD 120.

In order to improve performance for large data transfers, the DRAM 150 maintains ring buffers, a portion of the buffers used as read buffers and the remaining buffers used as write buffers, as depicted in FIG. 1. The ring buffers simplify the addressing scheme of the read and write data buffers. Instead of the conventional addresses that go from zero to a maximum value, which then has to wrap around as more data is transferred, the addresses maintained by the ring buffers are referenced by a head pointer and a tail pointer that are simply adjusted according to the size of data in a read or write request.

As data transfer rates increase (as is currently the case for SATA and NVMe devices), reading and writing large amounts of data to and from the external DRAM 150 across the DRAM interface 136 results in high power consumption and increased latency of data transfer. Currently the data transfer rates are as high as 7 GB per second, and may be bidirectional. This means that each of the read buffer and the write buffer will require a DRAM 150 that is running at over twice the rate of the host 110. This is because, during a read operation data is transferred at a rate of 7 GB per second when being transferred from the NAND devices 140 to the DRAM 150, for example, and the data is then sent from the DRAM 150 to the host 110 at 7 GB per second. Each time the DRAM 150 is accessed for the transfer of data, power is consumed by both the DRAM 150 and the bus drivers of the DRAM interface 136. Often the SSD 120 is often limited with the amount of power it can draw. Additionally, the SSD may be in receipt of parallel read/write requests from the host 110 at any one time. Thus data transfers to and from the DRAM 150 will have a noticeable impact on the power consumed by the SSD 120. SSDs 120 with limited power budgets having increased data transfers involving the DRAM 150 may limit or throttle the rate of data transfers to keep within a power budget and will therefore suffer from lower performance due to the increased power consumption by the DRAM 150 during such data transfers as the SSD 120 is power limited.

Further, in the case of a read request, for example, the data read from a target NAND device 140 may contain more errors than can be easily decoded by the controller 160. In such cases, additional data from the NAND devices 140 may be necessary for error correction, for example by performing re-reads or RAID reconstruction. Such error correction may result in a read request that takes a longer time than that for data which contains less errors. This results in different latencies of the data retrieved from the NAND devices 140.

Additionally, some NAND devices 140 may be processing other requests received prior to the current request. As such, the controller 160 may have to wait for the earlier requests at a target NAND device to be completed before attending to the current request, which also results in a varying retrieval times from a target NAND device, thereby increasing data latency.

To cope with the different latencies of the data read from the NAND devices 140, the read and write buffers in the DRAM 150 are used to accumulate the requested data. Once all the requested data has been retrieved from the target NAND devices and accumulated in the read buffer of the DRAM 150, the accumulated data is pushed to the host 110. Due to the number of requests in flight, the read buffers and the write buffers in the DRAM 150 may have to be large, e.g. 50 MB, so as to accumulate all the data associated with the requests. This increases power consumption of the SSD.

According to an embodiment of the present disclosure, there is provided a method of servicing read requests and write requests from the host 110 by enhancing the function of the ring buffers in the DRAM 150. This is done by using the internal SRAM 170 of the SoC 130 as read and write buffers in the first instance, instead of relying solely on the buffers of the external DRAM 150. The SRAM 170 uses a significantly less power compared to the DRAM 150 during data transfers. By using the internal buffers of the SRAM 170 without having to solely rely on the external DRAM 150, the power consumed by the SSD 120 would be significantly reduced. Further, on the fly data transfers between the SRAM 170 and the NAND devices 140 reduces the latency in read and write requests when multiple operations are being executed.

As previously mentioned, due to the simplicity of implementation, the read and write buffers in the SRAM 170 may also be configured as ring buffers. Here requests from the host 110 are handled by the controller 160 which determines whether the data to be transferred can be accumulated in the SRAM 170 buffers, or if a portion of the data needs to be additionally accumulated in the DRAM 150. The requests are handled transparently, which is to say that the control logic and/or processors within the host interface 132 or NAND interface 134 which are controlling the transfers are unaware whether the data is stored in the SRAM 170 or the DRAM 150. Once the data has been successfully accumulated, the controller 160 pushes the data either to the host 110 in the case of a read request, or to the NAND devices 140 in the case of a write request.

In this manner, the memory controller 160 effectively diverts data into the local SRAM 170 and any subsequent accesses. When the host 110 or the target NAND devices 140 are ready, the controller 160 fetches the data accumulated in the local SRAM 170 transparently. Here the controller 160 manages movement of the data between the host 110 and the target NAND devices 140 internally within the SRAM 170 in order to fulfil a read or write request. The controller 160 therefore is the only part of the system that realizes that the data has been accumulated locally within the SRAM 170. All other systems within the SoC 130 and within the SSD 120 assume that the data has been entirely stored in the external DRAM 150 prior to being transferred to the host 110 (in the case of a read request) or the target NAND devices (in the case of a write request).

When transferring the data, the memory controller 160 splits the data into defined units. Typically each defined unit would be 4,096 bytes (approximately 4 KB), for example, however the scope of the present disclosure includes data units of any other size. This means that the local SRAM 170 will store data in individual blocks of 4 KB, i.e. the SRAM 170 has data slots of 4 KB each for accumulating data. The controller 160 maintains a tally of the number of available data slots in the SRAM 170, known as the SRAM slot machine (SSM). By checking with the SSM, the controller 160 decides on the fly whether the local SRAM read/write buffer is able to accumulate the data unit of a particular block of data. If the SRAM 170 does not have any available slots (i.e. the SRAM does not have available space), the controller 160 redirects the data unit to the read/write buffer in the DRAM 150.

The availability of the buffers in the local SRAM 170 to store data units relating to a read or write request is dependent on the configuration of the SRAM 170. Such configuration of the SRAM 170 is dependent operating parameters programmed into the firmware configuration circuit 165 coupled to the controller 160. The operating parameters may be stored in the firmware configuration circuit 165 by software written code, for example. Exemplary operating parameters may include the number of buffers to be allocated as read buffers to handle read requests and the number of buffers to be allocated as write buffers to handle write requests.

Generally, the read requests are of greater importance that the write requests. This is because the data required by a read request needs to be supplied to the host 110 as quickly as possible because without such data, the host 110 cannot continue with its operations. Thus the thread of execution of the host 110 waits for the data in a read request until it is made available by the SSD 120 and cannot proceed until the data is obtained. Thus the SSD 120 will prioritize read requests over write requests, and it does so by programming the SRAM 170 via the firmware configuration circuit 165 such that read requests can consume more of the internal buffers of the SRAM 170 than the write requests. In some instances, write requests are able to fill up the internal buffer of the SRAM 170 but the controller 160 will have to leave a certain amount of space in the SRAM 170 buffers which is dedicated only for read commands.

During operation, the SSD 120 will process multiple commands in parallel, such as, for example, a mixture of read requests and write requests in its submission queue. There is a significant difference between the time it takes for a read request to be fulfilled (of the order of tens of microseconds) by the NAND devices 140 and the time it takes for a write request to be fulfilled (of the order of milliseconds) by the NAND devices 140, the read requests being fulfilled faster. This is because when a read request is received, the controller 160 will immediately begin processing the read request by fetching the requested data from the NAND devices 140. As soon as the controller 160 fetches the data for the read request, the controller begins to process the next request in the submission queue which may be another read request or a write request, regardless of whether the requested data for the first read request has been returned.

In contrast, write operations involve multiple steps that include buffering and acknowledgement back to the host 110 as soon as the data units reach the internal buffer of the SRAM 170. Thus there is no urgent need to get all the data units from the SRAM 170 immediately to the target NAND devices 140 as the data is already accumulated within the SSD 120; the transfer of data units from the write buffer of the SRAM 170 to the target NAND devices 140 can occur at any time after an acknowledgement is sent to the host 110. However for read requests, there is an urgent need to fetch the requested data units from the respective NAND devices 140, in a parallel fetch operation, and accumulate the data in the read buffers of the SRAM 170, as the host 110 cannot proceed without the requested data. Only after all the data units have been fetched can the requested data be assembled in the read buffer of the SRAM 170 and returned to the host 110 so that the host 110 can proceed with other tasks using the read data.

Figure 2:
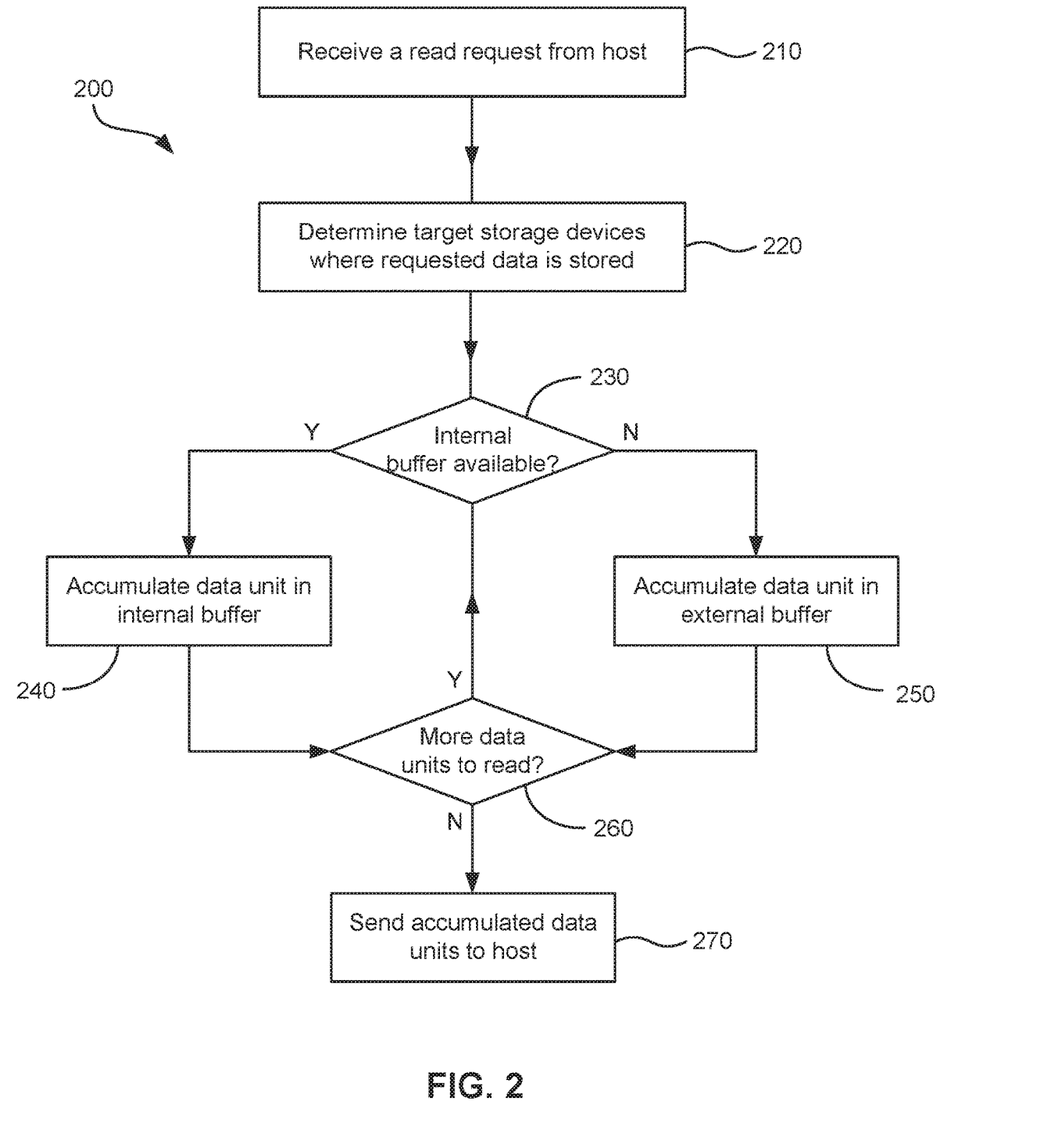
FIG. 2 is a flow diagram of method steps for processing a read request from a host according to one or more embodiments of the present disclosure.

FIG. 2 illustrates an exemplary flow diagram of a method 200 for processing a read request from the host 110 according to an embodiment of the present disclosure. The method begins at step 210 where a read request is received from the host 110 via the host interface 132 of the SoC 130. In step 220, the read request is processed by flash translation layer firmware running on the SoC 130 where the firmware locates the specific page and NAND chip from the NAND devices 140 in which the requested data is stored. Firmware running on the SoC 130 then sends a command to the NAND devices 140 to retrieve the requested data and transfer it to DRAM 150 via the memory controller 160. As previously mentioned, this retrieval of read data is quick and usually spans tens of microseconds. The controller 160 also determines the size of the data and the number of data units it occupies in view of the SSM of the internal SRAM 170.

In step 230, the controller 160 determines if an internal read buffer in the SRAM 170 is available for a data unit of the requested data. If there is an available slot in the read buffer of the SRAM 170 to hold the data unit, i.e. 'Y' at step 230 in FIG. 2, the data unit is transparently transferred from the relevant NAND device 140 to the read buffer of the SRAM 170 in step 240. No data is transferred to the DRAM 150. If there are no available slots in the read buffer of the SRAM 170 to store the data unit, i.e. 'N' at step 230 in FIG. 2, the data unit is transferred to the read buffer of the DRAM 150, as indicated in step 250. The controller then determines if there are more data units from the requested data to be transferred from the NAND device 140 in step 260. If there are more data units to be transferred out from the NAND device 140, i.e. 'Y' at step 260, the method returns to step 230 as described above.

If there are no more data units to be transferred out from the NAND devices 140 and all the requested data units have been accumulated in the internal read buffer of the SRAM 170 and the external DRAM 150 (where applicable), i.e. 'N' at step 260, the data is assembled and pushed to the host 110 in step 270, where the firmware of the SoC 130 sets up a data transfer between the read buffer in DRAM 150 and the host 110. The read data units in the SRAM 170 and the external DRAM 150, may then be cleared. It should be noted that in accordance with embodiments of the present disclosure, the read buffer of the SRAM 170 rarely runs out of slots for the read data, and so it is unlikely that the DRAM 150 would be utilized in a read operation. By relying on the internal SRAM 170 in this manner, the SSD 120 would not require a DRAM 150 with high bandwidth and power consumption.

As an example of a read request according to the method 200 of the present disclosure, assume that host 110 requires data units A-E from the NAND devices 140. Each of the data units A-E fits one slot in the SSM. The firmware of the SoC 130 sets up a data transfer of the data units A-E from the NAND devices 140 to the DRAM 150 via the controller 160. Once each data unit is retrieved from the relevant NAND devices 140 and transferred to the controller 160, the controller 160 determines if the read buffer of the SRAM 170 has an available slot for the respective data unit it is required to store. Thus, when data unit A is retrieved, the controller 160 receives a request to store the data unit A and determines if the read buffer of the SRAM 170 has an available slot for data unit A. If it does, data unit A is transparently transferred from the NAND devices 140 to the read buffer of the SRAM 170. The controller then receives requests to store the remaining data units. In this example data units B-E still have to be retrieved. The controller 160 then repeats step 230 for each of the remaining data units B-E as they are retrieved from the NAND devices 140. If the controller 160 determines that the read buffer of the SRAM 170 does not have any available slots for a particular data unit, say data unit C for example, the controller stores data unit C from the relevant NAND device 140 to the read buffer of the external DRAM 150.

In this example, data units D-E remain, and so the controller repeats step 230 for each of data units D-E as they are retrieved from the NAND devices 140. Thus, when receiving data unit D for storage, the controller once again determines if the read buffer of the SRAM 170 has an available slot for data unit D. If it does, data unit D is transparently transferred from the NAND devices 140 to the read buffer of the SRAM 170. Note that the read buffer of the internal SRAM 170 may have freed up due to the completion of other parallel requests in the time between storage of data unit C in the read buffer of the DRAM 150 and retrieval of data unit D from the NAND devices 140. The controller then repeats step 230 for data unit E. According to embodiments of the present disclosure, the SRAM is preferred for the accumulation of read data units as it consumes less power than the DRAM. Thus in this example, data units A, B, D and E are accumulated transparently in the read buffer of the SRAM 170 while data unit C is accumulated in the read buffer of the DRAM 150. After all of the data units A-E have been accumulated, the firmware of the SoC 130 sets up a data transfer from DRAM 150 to the host 110. The controller 160 transparently reads the data units A, B, D and E from the SRAM 170 and data unit C from DRAM 150, after which the read data units A-E in the SRAM 170 and DRAM 150 are cleared.

Figure 3:
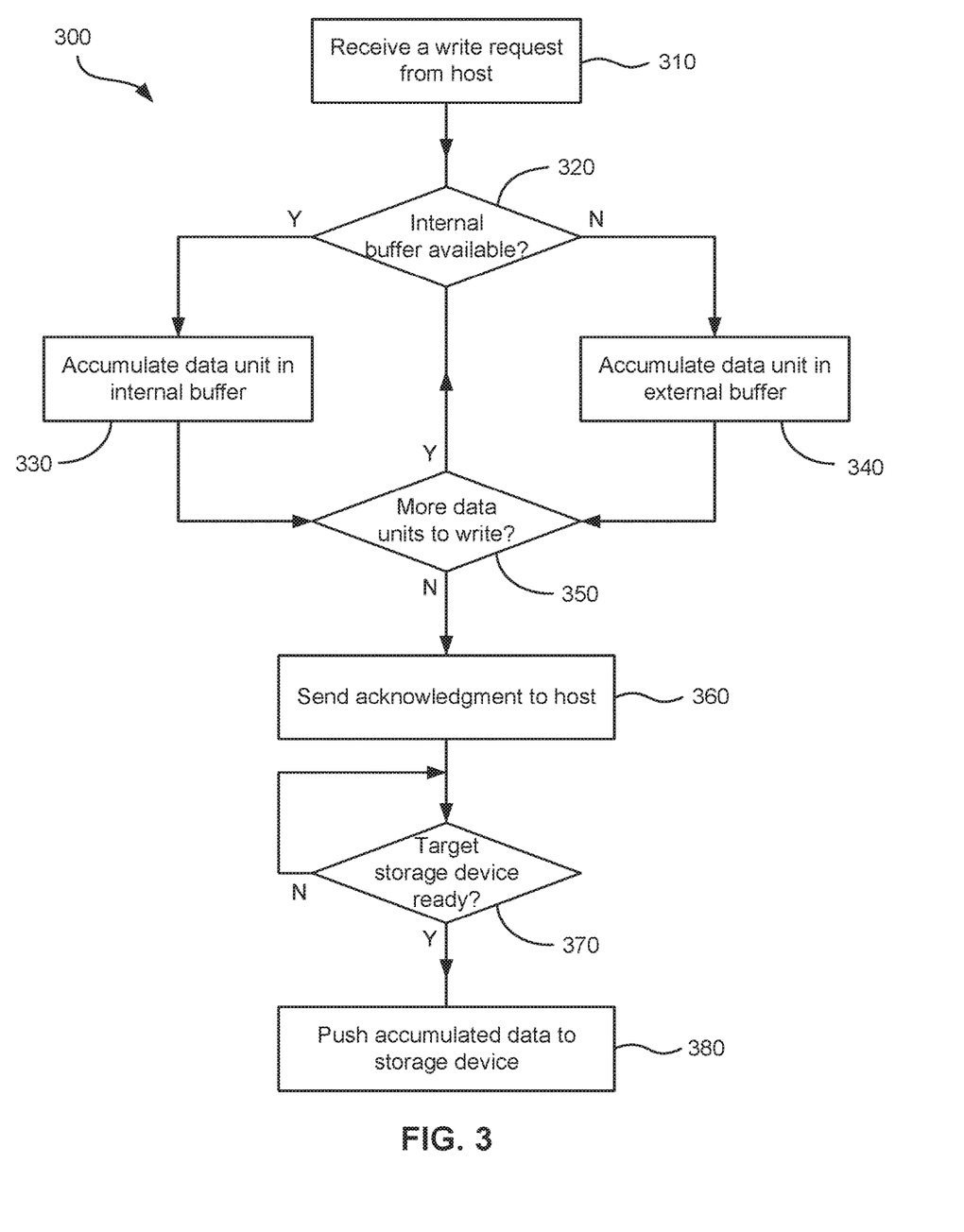
FIG. 3 is a flow diagram of method steps for processing a write request from a host, according to one or more embodiments of the present disclosure.

FIG. 3 illustrates an exemplary flow diagram of a method 300 for processing a write request from the host 110 according to an embodiment of the present disclosure. The method begins at step 310 where a write request is received from the host 110 via the host interface 132 of the SoC 130. The write request comprises data and target NAND devices 140 to which the data is to be written. The write request is processed by the firmware of the SoC 130 which sets up a data transfer between the host 110 and the DRAM 150. The controller 160 receives store commands for the data and determines the size of the data and the number of data units it occupies in view of the SSM of the internal SRAM 170.

In step 320, the controller 160 determines if an internal write buffer in the SRAM 170 is available for a data unit of the write data. If there is an available slot in the write buffer of the SRAM 170 to temporarily store the data unit, i.e. 'Y' at step 320 in FIG. 3, the data unit is transparently transferred from the host 110 to the write buffer of the SRAM 170 in step 330. In some implementations, in step 330 the data unit is also transferred to the write buffer of the DRAM 150, which allows the space occupied by the data unit in SRAM 170 to be freed immediately after the data unit is transferred to the NAND device in step 380, which in turn more quickly provides space for subsequent data units transferred from the host 110. This allows the data unit in DRAM 150 to serve as a backup in the rare event that the program operation to the NAND device fails, which may occur several milliseconds after the data unit is transferred to the NAND device. In this way, the DRAM 150, which is still being used to store data units, is rarely, or much less frequently, called upon to have data units read (if there was no space in the local write buffer in the SRAM 170 for the transfer from the host or if the program operation to the NAND device fails, then the data unit must be read or re-read from the DRAM 150) thereby effectively reducing the memory bus bandwidth by almost 50%. If there are no available slots in the write buffer of the SRAM 170 to store the data unit, i.e. 'N' at step 320 in FIG. 3, the data unit is transferred to the write buffer of the DRAM 150, as indicated in step 340. The controller then determines if there are more data units from the write data to be transferred from the host 110 in step 350. If there are more data units to be transferred in from the host 110, i.e. 'Y' at step 350, the method returns to step 320 as described above.

If there are no more data units to be transferred in from the host 110 and all the write data units have been accumulated in the internal read buffer of the SRAM 170, and the external DRAM 150 (where applicable), i.e. 'N' at step 350, an acknowledgement message is sent to the host 110 in step 360 to indicate that the write request and associated data has been received by the SSD 120. It should be noted that at this point the write data has not been written to the NAND devices 140. Rather the data units have only been transparently transferred from the host 110 to the internal write buffer of the SRAM 170, and the external DRAM 150 (where applicable). The NAND interface 134 then sets up a data transfer between the DRAM 150 for the data units (via the memory controller 160, which, for each data unit, retrieves the data unit from SRAM 170 if the data unit was stored there by the controller 160 rather than the DRAM 15) and determines if the target NAND devices 140 are ready for receiving the accumulated write data in step 370. The NAND devices 140 may not all be ready at the same time to receive the accumulated write data as they may be involved in other read/write request which may not have completed yet. The determination in step 370 is therefore done on the fly and as soon as one of the target NAND devices 140 is ready, i.e. 'Y' at step 370, one or more data units, depending on the number of data units per NAND device flash page, from the accumulated write data is pushed to the target NAND device 140. In some examples the write data is typically sent to the NAND devices in a 96 KB DMA transfer (as a scatter gather list of 4 KB data units) for a NAND device flash page size of 96 KB. As each 4 KB data unit is transferred to the NAND device, the corresponding data slot occupied by the data unit in the SRAM 170 may be freed (in other words, it need not be necessary to wait until the whole 96 KB NAND device flash page is transferred before individual 4 KB data unit slots in the SRAM 170 may be freed). This is done repeatedly until all the accumulated data units are pushed to the respective target NAND devices 140. If none of the NAND devices are ready, i.e. 'N' at step 370, the NAND interface 134 waits until a target NAND device 140 becomes available. Once the data units are transferred to the NAND devices, the write data units in the SRAM 170 may be freed. Once the data units which have been transferred are successfully programmed into the NAND devices, which may occur several milliseconds later, the data units in DRAM 150 may be cleared.

In the event of a power loss to the SSD 120, the data units in the SRAM 170 may already have been freed before the data unit has been successfully programmed into the NAND memory device. To prevent the write data from being permanently lost during a power loss event, the data units accumulated in the internal write buffer of the SRAM 170 may be simultaneously accumulated in the write buffer of DRAM 150, such that the data units are duplicated or backed up in the DRAM 150. In this manner, after a power loss event and while the SSD 120 is operating under backup power from a secondary power source such as batteries or super capacitors, the write data units that have been backed up in the DRAM 150 are pushed into the target NAND devices 140 thereby successfully writing the data received from the host 110 to the NAND devices 140. As noted previously, data units duplicated or backed up in the DRAM 150, may also be transferred for a second time into the NAND device 140 in the event that the data units transferred failed to be programmed correctly and the data unit in the SRAM 170 had already been freed.

As an example of a write request according to the method 300 of the present disclosure, assume that host 110 requests that data units A-E be written to target NAND devices 140. Each of the data units A-E fits one slot in the SSM. Once the data units A-E are presented to the SSD 120 by the host 110, the controller determines if the write buffer of the internal SRAM 170 is available for at least one of the data units A-E. If the SSM indicates that there are two slots available, write data units A-B are transparently pushed into the write buffer of the SRAM 170. Note that data units A-E may be transferred in any order and need not be alphabetical as exemplified here. The controller then determines if there are more data units to be written. In this example data units C-E still have to be written. The controller 160 then repeats step 320 for each of the remaining data units C-E as they are received from the host 110. After all of the data units A-E have been accumulated in the SRAM 170, an acknowledgement message is sent to the host 110 to indicate that the write request and associated data has been received by the SSD 120. The controller may also simultaneously store the data units A-E in the DRAM 150 as a backup to guard against power loss and to enable the freeing up of space in the write buffer of SRAM 170 once data units have been transferred to, but not yet programmed into, NAND devices 140. The NAND interface 134 then determines on the fly whether the target NAND devices 140 are ready. As each target NAND device 140 becomes ready, the data units A-E are transferred from the write buffer of the internal SRAM 170 to the respective NAND devices 140. As each data unit is transferred to the NAND devices 140, the write data units in the write buffer of the SRAM 170 are freed. After each data unit is successfully programmed into NAND device 140, the corresponding write data unit in the write buffer of the DRAM 150 is freed.

If the controller 160 determines that the read buffer of the SRAM 170 does not have any available slots for a particular data unit, say data unit C for example, the controller transfers data unit C from the host 110 to the write buffer of the DRAM 150. The controller then determines if there are more data units to be received from the host 110. If data units D-E remain, the controller repeats step 320 for each of data units D-E as they are received from the host 110. Thus, when receiving data unit D, the controller 160 once again determines if the write buffer of the SRAM 170 has an available slot for write data unit D. If it does, data unit D is transparently transferred from the host 110 to the write buffer of the SRAM 170. Note that the write buffer of the internal SRAM 170 may have data unit slots that have been freed up due to the completion of other parallel requests in the time between storage of data unit C in the write buffer of the DRAM 150 and receipt of data unit D from the host 110. As previously noted, the simultaneous transfer of data units to the write buffer of DRAM 150 as they are transferred to the write buffer of local memory SRAM 170, enables the data units in write buffer in SRAM 170 to be freed up as soon as the data unit is transferred to NAND devices 140, without waiting for the programming operation of the data unit to NAND devices 140 to be successfully completed, which ensures that the data units in the write buffer are occupied for the minimum amount of time, increasing the likelihood that incoming data units from the host 110 can be found space to be stored in the write buffer of the SRAM 170. The controller 160 then repeats step 320 for write data unit E. According to embodiments of the present disclosure, the SRAM 170 is preferred for the accumulation of read data units as it enables faster read and write access times and consumes less power than the DRAM 150. Thus in this example, data units A, B, D and E are accumulated transparently in the write buffer of the SRAM 170 while data unit C is accumulated in the write buffer of the DRAM 150.

After all of the data units A-E have been accumulated, an acknowledgement message is sent to the host 110 to indicate that the write request and associated data has been received by the SSD 120. The controller may also store a backup of the data units A, B, D and E accumulated in the SRAM 170 in the DRAM 150 to guard against power loss and to enable the freeing up of space in the write buffer of SRAM 170 once data units have been transferred to, but not yet programmed into, NAND devices 140. The controller 160 then determines on the fly whether the target NAND devices 140 are ready. As each target NAND device 140 becomes ready, the write data units A, B, D and E are transferred from the write buffer of the internal SRAM 170, and the write data unit C from the write buffer of the DRAM 150, to the respective NAND devices 140. After each data unit has been transferred to the NAND devices 140, the corresponding write data unit in the SRAM 170 is freed. After each data unit is successfully programmed into NAND device 140, the corresponding write data unit in the write buffer of the DRAM 150 is freed.

Other objects, advantages and embodiments of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

The invention claimed is:

1. A solid-state drive (SSD) comprising:
an integrated circuit comprising:
  a memory controller having an interface, and
  an internal buffer internal to the integrated circuit and communicatively coupled to the memory controller; and
an external buffer external to the integrated circuit and within the SSD, and communicatively coupled to the memory controller via the interface of the memory controller,
wherein the memory controller is configured to
  receive a request to write data to an available buffer, the data being segmented into a plurality of units of data,
  determine, for each unit of data of the plurality of units of data, availability of the internal buffer to temporarily store the unit of data,
  if the internal buffer is available, write the unit of data to the internal buffer without writing to the external buffer, and
  if the internal buffer is not available, write the unit of data to the external buffer without writing the unit of data to the internal buffer.

2. The SSD of claim 1, wherein the memory controller is further configured to remove the unit of data from the internal buffer or the external buffer after the unit of data is stored into a nonvolatile semiconductor storage device.

3. The SSD of claim 1, wherein the memory controller is configured to store in the external buffer a backup copy of the plurality of units of data accumulated in the internal buffer.

4. The SSD of claim 3, wherein the memory controller is configured to remove the backup copy of the plurality of units of data in the external buffer after the plurality of units of data are stored into a nonvolatile semiconductor storage device.

5. The SSD of claim 1, wherein the memory controller is configured to send a message to a host to indicate completion of the write request after all the plurality of units of data subject to the write request are written to the internal buffer or the external buffer.

6. The SSD of claim 5, wherein the memory controller is configured to send the message to a host prior to storing the plurality of units of data subject to the write request into a nonvolatile semiconductor storage device.

7. The SSD of claim 1, wherein the memory controller is configured to transfer the plurality of units of data stored in the internal buffer or external buffer to a nonvolatile semiconductor storage device as and when the nonvolatile semiconductor storage device becomes available for storage of the plurality of units of data.

8. The SSD of claim 3, wherein the memory controller is configured to transfer the plurality of units of data in the external buffer instead of the units of data stored in the internal buffer to the nonvolatile semiconductor storage device in the event of a power loss or a program failure.

9. The SSD of claim 1, wherein the memory controller is further configured to receive a request to read data, the read data corresponding to the unit of data, and further configured to:
  if the unit of data was written to the internal buffer, read the unit of data from the internal buffer, and
  if the unit of data was written to the external buffer, read the unit of data from the external buffer.

10. The SSD of claim 9, wherein the memory controller is configured to:
  if the unit of data was written to the internal buffer, remove the unit of data from the internal buffer after the unit of data has been read, and
  if the unit of data was written to the external buffer, remove the unit of data from the external buffer after the unit of data has been read.

11. The SSD of claim 9, wherein the memory controller is configured to determine, for read data corresponding to the unit of data, availability of the internal buffer to temporarily store the unit of data, wherein
  if the internal buffer is available, write the unit of data in the internal buffer, and
  if the internal buffer is not available, write the unit of data to the external buffer.

12. The SSD of claim 1, wherein each of the internal buffer and the external buffer comprises a plurality of write buffers and a plurality of read buffers.

13. The SSD of claim 12, wherein each of the plurality of read buffers and the plurality of write buffers comprise ring buffers.

14. The SSD of system claim 12, further comprising a programmable firmware configuration circuit coupled to the memory controller that is configured to set a number of read buffers and a number of write buffers in the internal buffer.

15. The SSD of claim 1, wherein the integrated circuit is a part of a solid-state drive (SSD).

16. A method performed by a controller of a solid-state drive (SSD), the SSD having an integrated circuit, the integrated circuit comprising the controller and an internal buffer, the method comprising:
receiving a write request from a host interface connected to a host, the write request containing data from the host and target nonvolatile semiconductor storage devices of a plurality of nonvolatile semiconductor storage devices contained in the SSD in which the data is to be written, wherein the data subject to the write request is segmented into a plurality of units of data;
determining, for each unit of data, the availability of the internal buffer to temporarily accumulate the unit of data, wherein
if the internal buffer is available, accumulating the unit of data from the host to the internal buffer, and
if the internal buffer is not available, accumulating the unit of data from the host to an external buffer communicatively coupled to the controller via an interface of the controller, wherein the external buffer is external to the integrated circuit and within the SSD; and
storing a backup copy of the plurality of units of data accumulated in the internal buffer, in the external buffer.

17. The method of claim 16, further comprising:
removing, by the controller, the accumulated the plurality of units of data from the internal buffer and the external buffer.

18. The method of claim 16, further comprising:
removing, by the controller, the backup copy of the plurality of units of data in the external buffer once the plurality of units of data are programmed into the target nonvolatile semiconductor storage devices.

19. The method of claim 16, further comprising:
sending, by the controller, a message to the host to indicate completion of the write request after the plurality of units of data are temporarily accumulated in the internal buffer and the external buffer.

20. The method of claim 16, further comprising:
transferring, by the controller, the units of data in the external buffer instead of the data accumulated in the internal buffer to the target nonvolatile semiconductor storage devices in the event of a power loss or a program failure in at least one of the nonvolatile semiconductor storage devices.

21. The method of claim 16, further comprising:
programming, by a firmware configuration circuit coupled to the controller, a number of read buffers and a number of write buffers in the internal buffer,
wherein the number of read buffers exceeds the number of write buffers.

22. A method performed by a controller of a solid-state drive (SSD), the SSD comprising an integrated circuit, the integrated circuit comprising the controller and an internal buffer, the method comprising:
receiving a read request for data from a host interface connected to a host, wherein the data subject to the read request is segmented into a plurality of units of data;
receiving, from a device interface connected to a plurality of nonvolatile semiconductor storage devices contained in the SSD, one or more target nonvolatile semiconductor storage devices of the plurality of nonvolatile semiconductor storage devices in which the data subject to the read request are stored;
determining, for each unit of data of the plurality of units of data, the availability of the internal buffer of the controller to temporarily accumulate the unit of data, wherein
if the internal buffer is available, accumulating the unit of data from the one or more target nonvolatile semiconductor storage devices to the internal buffer, and
if the internal buffer is not available, accumulating the unit of data from the one or more target nonvolatile semiconductor storage devices to an external buffer communicatively coupled to the controller via an interface of the controller, wherein the external buffer is external to the integrated circuit and within the SSD; and
transferring the accumulated data corresponding to the data subject to the read request to the host interface for delivery to the host.

23. The method of claim 22, further comprising:
removing, by the controller, the accumulated the plurality of units of data from the internal buffer and the external buffer.

24. The method of claim 22, further comprising:
programming, by a firmware configuration circuit coupled to the controller, a number of read buffers and a number of write buffers in the internal buffer,
wherein the number of read buffers exceeds the number of write buffers.

* * * * *